(12) United States Patent
Seiler

(10) Patent No.: US 10,942,569 B2
(45) Date of Patent: Mar. 9, 2021

(54) SYSTEMS AND METHODS FOR MULTISENSORY-ENHANCED AUDIO-VISUAL RECORDINGS

(71) Applicant: SONICSENSORY, INC., Los Angeles, CA (US)

(72) Inventor: Brock Maxwell Seiler, Jefferson Valley, NY (US)

(73) Assignee: SonicSensory, Inc., Los Angeles, CA (US)

( * ) Notice: Subject to any disclaimer, the term of this patent is extended or adjusted under 35 U.S.C. 154(b) by 0 days.

(21) Appl. No.: 16/019,527

(22) Filed: Jun. 26, 2018

(65) Prior Publication Data

US 2018/0373335 A1 Dec. 27, 2018

Related U.S. Application Data

(60) Provisional application No. 62/524,903, filed on Jun. 26, 2017.

(51) Int. Cl.
*G06F 3/01* (2006.01)
*H04N 21/43* (2011.01)
(Continued)

(52) U.S. Cl.
CPC .............. *G06F 3/016* (2013.01); *G06F 3/002* (2013.01); *G06F 3/16* (2013.01); *G06F 3/167* (2013.01);
(Continued)

(58) Field of Classification Search
CPC . G06F 3/002; G06F 3/016; G06F 3/16; G06F 3/167; G06F 8/61; G06F 3/048;
(Continued)

(56) References Cited

U.S. PATENT DOCUMENTS

| | | | |
|---|---|---|---|
| 2005/0195367 A1* | 9/2005 | Selander | A61L 9/125 352/85 |
| 2008/0103637 A1* | 5/2008 | Bliven | F16B 2/20 701/1 |

(Continued)

*Primary Examiner* — Richard J Hong
(74) *Attorney, Agent, or Firm* — Neal, Gerber & Eisenberg LLP; Michael G. Kelber; Nawshaba M. Siddiquee

(57) ABSTRACT

Embodiments include a portable system for delivering multi-sensory stimulation to a user in association with audio-visual content. The system comprises sensory output modules individually capable of delivering a different sensory output to the user in synchrony with a corresponding portion of the audio-visual content, and a housing comprising the modules and configured for attachment to an electronic device capable of presenting the audio-visual content to the user. Embodiments also include a method of delivering multi-sensory stimulations to a user in association with audio-visual content provided by an electronic device. The method comprises receiving an audio signal associated with the audio-visual content via a wireless transceiver; broadcasting the audio signal to sensory output modules; at the modules, generating a sensory output command based on the audio signal and a sensory output capability of the module; and outputting a sensory output from each of the modules based on the command generated thereby.

19 Claims, 5 Drawing Sheets

(51) Int. Cl.
*G06F 3/16* (2006.01)
*G06F 3/00* (2006.01)
*H04N 21/41* (2011.01)

(52) U.S. Cl.
CPC ..... *H04N 21/4131* (2013.01); *H04N 21/4307* (2013.01)

(58) Field of Classification Search
CPC ........... H04N 21/4131; H04N 21/4307; H04N 21/436; H04N 21/812; G11B 27/034; H04M 1/72577; H04R 3/00; H04R 5/02; H04R 1/26; F04D 19/00; A47B 19/00; G09B 5/06; A61L 9/015; A61L 9/125; A61L 9/14; G10L 21/16; F16B 2/20
See application file for complete search history.

(56) References Cited

U.S. PATENT DOCUMENTS

| | | | |
|---|---|---|---|
| 2009/0180660 A1* | 7/2009 | Groset | H04R 5/02 381/386 |
| 2010/0114819 A1* | 5/2010 | Kim | A61L 9/015 707/616 |
| 2011/0123168 A1* | 5/2011 | Cho | H04N 21/812 386/230 |
| 2011/0125788 A1* | 5/2011 | Joo | G11B 27/034 707/769 |
| 2011/0126119 A1* | 5/2011 | Young | G06F 3/048 715/744 |
| 2011/0226864 A1* | 9/2011 | Kim | A61L 9/14 239/6 |
| 2011/0286613 A1* | 11/2011 | Lipsky | H04R 1/26 381/182 |
| 2014/0003622 A1* | 1/2014 | Ikizyan | H04R 3/00 381/95 |
| 2014/0038154 A1* | 2/2014 | Brownlow | G09B 5/06 434/317 |
| 2014/0267906 A1* | 9/2014 | Mickelsen | H04N 21/4131 348/515 |
| 2015/0070147 A1* | 3/2015 | Cruz-Hernandez | G10L 21/16 340/407.1 |
| 2015/0070148 A1* | 3/2015 | Cruz-Hernandez | G06F 3/167 340/407.1 |
| 2016/0174703 A1* | 6/2016 | Groenke | A47B 19/00 434/236 |
| 2017/0064073 A1* | 3/2017 | Spencer | H04M 1/72577 |
| 2017/0214962 A1* | 7/2017 | Ono | H04N 21/436 |
| 2018/0172013 A1* | 6/2018 | Dymond | F04D 19/00 |
| 2019/0182371 A1* | 6/2019 | Ashall | G06F 8/61 |

* cited by examiner

SYSTEMS AND METHODS FOR MULTISENSORY-ENHANCED AUDIO-VISUAL RECORDINGS

TECHNICAL FIELD

This disclosure generally relates to multi-sensory immersion and more specifically, to multi-sensory enhancement of various entertainment experiences using an electronic device.

BACKGROUND

Many consumers are seeking ways to experience multi-sensory immersions that are synchronized to audio-visual content from handheld and portable electronic media devices. The state of the art currently limits this to haptic effects from vibration motors that may come as standard features of such devices. Typically, if consumers desire other forms of audio-visually synchronized sensory stimulation, this must be provided by bulky external devices that reduce the convenience of having a portable or handheld experience.

Many consumers are also seeking new ways to add personalization to their video and audio recordings. Existing video editing software programs enable adding or altering certain content in video and audio recordings, but not in the multi-sensory context. Consumers are further seeking for websites and mobile applications that allow for social network sharing of customized personal video and audio recordings.

Thus, there is still a need for systems and methods that can provide new multi-sensory immersive experiences synchronized with audio-visual content on a portable device.

SUMMARY

The invention is intended to solve the above-noted and other problems by, among other things, providing (1) portable sensory output devices configured to deliver multi-sensory outputs to the user, (2) a portable encasement comprising the sensory output devices and attachable to a handheld or portable device, or other entertainment device, to provide a wide range of sensory stimuli that can be synchronized to audio-visual content playing on that device without sacrificing portability, and (3) a software-based tool for enhancing video and audio recordings with audio-visually synchronized haptic immersion and other sensory stimulus.

Example embodiments include a portable system for delivering multi-sensory stimulation to a user in association with audio-visual content, the system comprising: a plurality of sensory output modules individually capable of delivering a different sensory output to the user in synchrony with a corresponding portion of the audio-visual content; and a housing comprising the plurality of sensory output modules and configured for attachment to an electronic device capable of presenting the audio-visual content to the user.

Another example embodiment includes a method of delivering multi-sensory stimulations to a user in association with audio-visual content provided by an electronic device, the method comprising: receiving an audio signal associated with the audio-visual content via a wireless transceiver; broadcasting the audio signal to each of a plurality of sensory output modules via the wireless transceiver; at one or more sensory output modules, generating a sensory output command based on the audio signal and a sensory output capability of the module using a processor included in the module; and outputting a sensory output from each of the one or more sensory output modules based on the sensory output command generated by the module.

Yet another example embodiment includes a method of delivering multi-sensory stimulations to a user in association with audio-visual content provided by an electronic device, the method comprising: receiving a plurality of sensory output commands via a wireless transceiver; identifying an appropriate sensory output module for each sensory output command; and sending each sensory output command to the appropriate sensory output module via the wireless transceiver, each module delivering a sensory output to the user based on the received command.

Still another example embodiment includes a method of delivering a sensory stimulation to a user in association with audio-visual content being provided to the user. The method comprises receiving a sensory output command via a wireless transceiver; comparing, using a processor, identifying data included in the sensory output command to information stored in a memory; if the identifying data matches the stored information, adding the receiving sensory output command to a command queue; and executing each command in the command queue in sequential order.

Exemplary embodiments also include a method of enhancing media content provided to a user using an electronic device connected to at least one sensory output device. The method comprises receiving indication of a selected portion of the media content and a desired sensory output for the selected portion; generating at least one sensory output command based on at least one characteristic of the selected portion and the desired sensory output; and synchronizing output of the at least one sensory output command via the at least one sensory output device with playback of the selected portion on the electronic device.

These and other embodiments, and various permutations and aspects, will become apparent and be more fully understood from the following detailed description and accompanying drawings, which set forth illustrative embodiments that are indicative of the various ways in which the principles of the invention may be employed.

DETAILED DESCRIPTION

Figure 1:
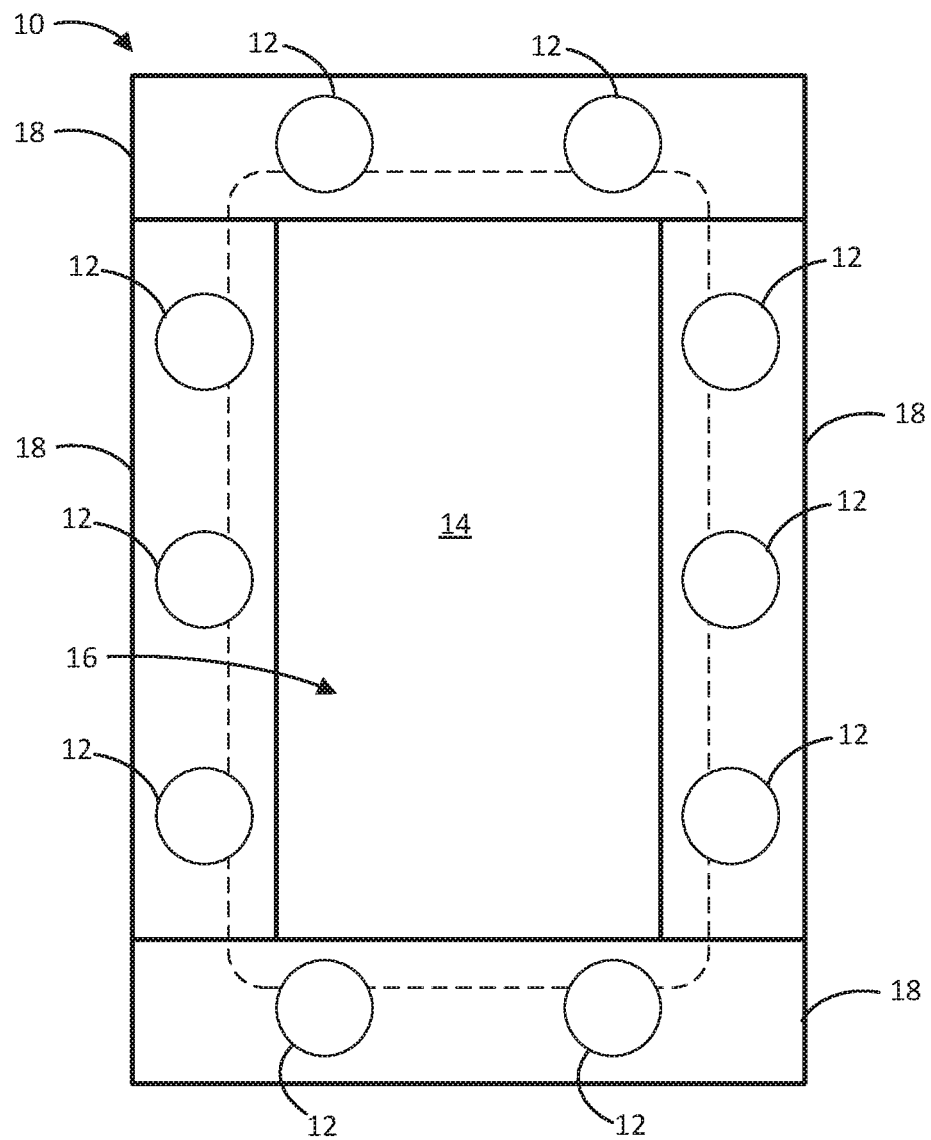
FIG. 1 illustrates a plan view of an exemplary sensory immersive encasement for a mobile device, in accordance with certain embodiments.

The description that follows describes, illustrates and exemplifies one or more particular embodiments of the invention in accordance with its principles. This description is not provided to limit the invention to the embodiments described herein, but rather to explain and teach the principles of the invention in such a way as to enable one of ordinary skill in the art to understand these principles and, with that understanding, be able to apply them to practice not only the embodiments described herein, but also other embodiments that may come to mind in accordance with these principles. The scope of the invention is intended to cover all such embodiments that may fall within the scope of the appended claims, either literally or under the doctrine of equivalents.

It should be noted that in the description and drawings, like or substantially similar elements may be labeled with the same reference numerals. However, sometimes these elements may be labeled with differing numbers, such as, for example, in cases where such labeling facilitates a more clear description. Additionally, the drawings set forth herein are not necessarily drawn to scale, and in some instances proportions may have been exaggerated to more clearly depict certain features. Such labeling and drawing practices do not necessarily implicate an underlying substantive purpose. As stated above, the specification is intended to be taken as a whole and interpreted in accordance with the principles of the invention as taught herein and understood to one of ordinary skill in the art.

One exemplary embodiment comprises a durable housing or encasement system made of suitable material into which a mobile device (e.g., smartphone, tablet, personal media player, etc.), virtual reality device (e.g., headset), or other portable audio-visual device or player may be attached. The encasement leaves the viewing screen of the attached device fully exposed to the user. The periphery of the encasement that surrounds the viewing screen includes a plurality of individual sensory output modules. Each module comprises the electronic and mechanical components needed to deliver, to the user, a specific stimulus that is initiated in synchrony with signals that can be wirelessly streamed to the system. In some cases, the stimulus-initiating signals are streamed within the audio and video content being viewed or listened to on the portable device. Each of the plurality of stimulus modules may provide a different sensory stimulus through mechanisms including, but not limited to, haptic transducers, speakers, fan motors, heating and cooling elements, aroma discharge devices, water vapor discharge devices, or any other sensory immersion modality. The overall design of the encasement may be streamlined and light weight, and designed to substantially increase the overall dimensions of the portable media device, freeing the consumer to use it in accordance with its original portable design, while also enjoying a full range of audio-visually synchronized sensory stimuli.

In some embodiments, the encasement device may have a streamlined configuration that is suitable for computers or laptops, and/or home entertainment systems. For example, in one embodiment, the encasement device is configured for reconfiguration from a box-like encasement to a strip-like device that can be attached to the perimeter of a computer monitor, laptop screen, or other display screen to which the user sits in close proximity. In another embodiment, the encasement is adapted for use with large LCD monitors or flat screen televisions in a home entertainment system. In this embodiment, the encasement is in the form of a strip-like panel that can be attached to the perimeter of the display screen. The encasement would contain all of the sensory output modules described above; however, these modules would have adequate power and be of a size that is suitable for delivering a given sensory stimulus across a larger distance (e.g., across a portion of a room) to the user or multiple users.

All of the above embodiments can be used to deliver multisensory stimulation to a user through uniquely edited or enhanced video and audio recordings that the user, himself, or another person, has created. For example, in some embodiments, the original recordings or media files may be imported into an editing or enhancement tool for expanding video and audio enhancement into the realm of audio-visually-synchronized haptic immersion with added sensory stimulus. The enhancement tool may be implemented or provided as an online or web-based program, a mobile application (e.g., "app"), a standalone software application, or a plug-in, filter, modification (e.g., "mod"), add-on, or other downloadable piece of software for modifying or enhancing existing software. The user-selectable features of the enhancement tool may include overlaying added audio data, image file data, and sensory output module command signals into selected video sequences, as well as initiating functions that synchronize the sensory output modules to audio-visual content using selected characteristics of an audio signal envelope. The sensory command signals can be configured to trigger output devices (e.g., modules) that produce haptic vibrations and/or the sensation of wind, water vapor, aroma, temperature, and other sensations, in synchrony with selected portions of the audio-visual content.

In that regard, a basic representation of the system disclosed herein involves a host device, which may be any handheld smart device, such as, e.g., a smartphone, a tablet, etc., virtual reality player, laptop, PC, or home entertainment system. The host device may include, or have stored thereon, the video or audio recording to be edited. The user may import the video or audio recording from the host device to an enhancement tool, which may be accessible, for example, as an online or web-based program using a network connection (e.g., a standalone software program or plug-in), as a software application downloaded and stored in a memory of the host device (e.g., a mobile app, software instructions stored on a computer-readable medium, or a plug-in, filter, mod, add-on, or other piece of software configured for attachment to a pre-existing software program), through a pre-existing file sharing or social network (e.g., a filter, plug-in, add-on, or other piece of software application associated with the network). The enhancement tool allows the user to overlay, into selected segments of the imported video or audio recording, added audio files, image files, and various sensory command signals that will cause audio-visually synchronized output of multisensory stimulations to the user. The enhancement tool also allows selected characteristics of the imported audio envelope to trigger these multi sensory stimulations.

Once the enhancement is complete, the user or content creator can share the content-synchronized, sensory-enhanced recording with other users or consumers that have an encasement with sensory devices as described herein, or any device with at least a video screen, speaker, and haptic motor. In some cases, the enhancement tool may store the uniquely edited recordings in an online database to enable replaying and sharing of the recordings via an associated file-sharing network, social network, or other network or group of authorized users associated with the database (e.g., Facebook, Instagram, Snapchat, etc.). In such cases, the network interface may provide the enhancement tool as part of a video/audio editing platform. When a user logged onto the network plays back the edited recordings, unique multisensory immersions are experienced via commands received by the various multisensory output devices on an encasement coupled to the host device from which the recording was imported, or any other smart device logged into the network, and/or via the video screen, speaker, and haptic motor of said device. Other users logged into the sharing network may access the same recordings and play them through sensory devices like those described above to experience the same content-synchronized multisensory immersions.

FIG. 1 illustrates an exemplary multi-sensory immersive encasement 10 comprising a plurality of sensory output devices 12, in accordance with embodiments. The encasement 10 (also referred to herein as "housing") can be configured to encase, or be attached adjacent to, at least one side of a portable device 14 capable of presenting audio-visual or other media content to a user. In the illustrated embodiment, the encasement 10 is coupled to all four sides of, or a perimeter, of the portable device 14. The encasement 10 may be made of any suitable durable material, such as, e.g., plastic. The portable device 14 (also referred to herein as "host device") may be a mobile communications device, such as, e.g., a smartphone or tablet, or other mobile device, such as, e.g., a virtual reality player, portable media player, etc. As shown, the portable device 14 may be inserted into the encasement 10 such that at an LCD or other display screen 16 of the portable device 14 remains fully exposed to the user.

In embodiments, the encasement 10 includes a plurality of interlocking modular segments 18 that are designed to be detachable from each other using a suitable method such as, for example, tongue-in-groove, magnetic connectors, adhesive, hook and loop, ball and socket joint, rotatable and detachable hinges, etc., in order to enable removable attachment of the encasement 10 to the portable device 14. In some embodiments, each modular segment 18 comprises one or more of the sensory output modules 12. In other embodiments, at least one of the modular segments 18 may include other electronic components, such as, for example, a battery, wireless communication circuitry, or other required mechanisms, instead of, or in addition to, the one or more sensory output modules 12. In still other embodiments, one or more of the modular segments 18 may serve as spacers that include no electronic components whatsoever, but are configured to enable adaptation of a size and/or shape of the encasement 10 to accommodate different portable devices. In another embodiment, the encasement 10 may not be composed of modular segments, but rather a single frame-like structure. In all cases, the overall dimensions of the encasement 10 may be such that the encasement 10 does not add significant size or bulk to the portable device 14, as shown in FIG. 1.

Figure 2:
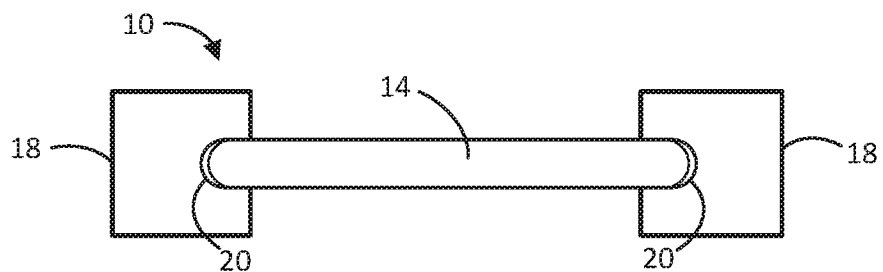
FIG. 2 illustrates an end elevation cross-sectional view of the sensory immersive encasement shown in FIG. 1, in accordance with certain embodiments.

FIG. 2 illustrates an exemplary cross-sectional end view of the encasement 10 coupled to the portable device 14. In embodiments, the encasement 10 may be configured to receive a portion of the portable device 14 or otherwise attach to the portable device 14. In the illustrated embodiment, the portable device 14 is held within the encasement 10 by inserting the portable device 14 into slots or grooves 20 formed into the inner sides of the modular segments 18. For example, each modular segment 18 may have a groove 20 sized and shaped to fit a side profile of the portable device 14, including a depth designed to receive only a certain portion of the edges of the portable device 10, as shown in FIG. 2. The grooves 20 may also be configured to retain the portable device 10 therein, for example, using adhesive, friction, or other suitable techniques. In some embodiments, the grooves 20 may be lined with grippy material (e.g., rubber, silicon, or the like) or gripping structures (e.g., nubs, etc.) to enable engagement with the portable device 10.

Figure 3:
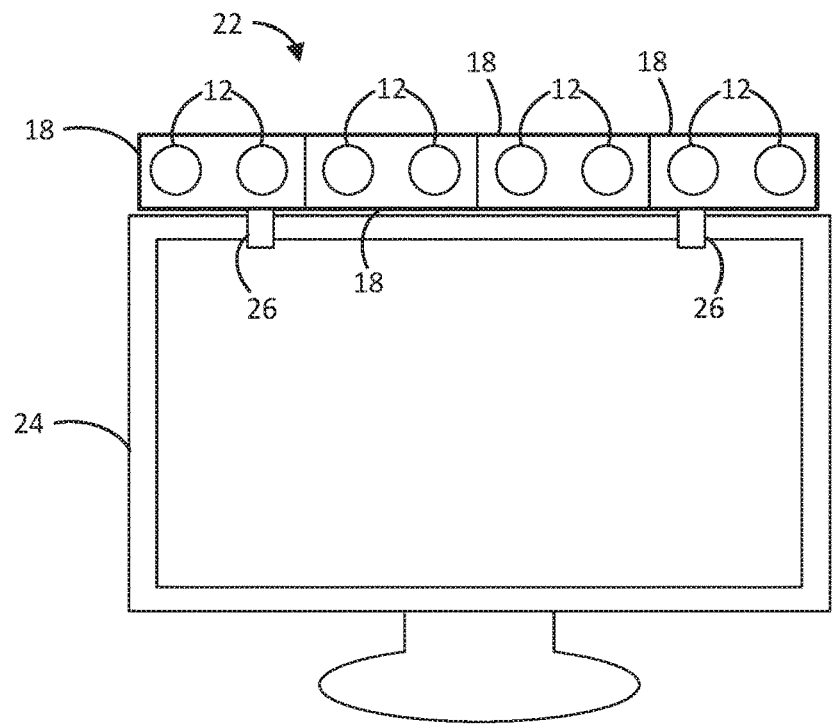
FIG. 3 illustrates a front view of an exemplary sensory immersive strip coupled to a display screen, in accordance with certain embodiments.

FIG. 3 depicts an exemplary sensory immersive strip 22 configured for attachment to a display screen 24 that is communicatively coupled to a laptop, personal computer, or other computing device capable of providing audio-video content to the display screen 24 for display thereon. In some embodiments, the sensory immersive strip 22 is formed by rearranging the modular segments 18 from the encasement 10 form shown in FIG. 1 to the strip form shown in FIG. 3. This reconfigurable feature of the encasement 10 enables use of the same system with both portable devices 10 and personal computers monitors, LCD screens, and other display screens 24. As an example, the interlocking modular segments 18 may include attachment mechanisms that enable detachment from each other while in the encasement 10 form and reattachment to each other to form a single straight line or the strip 22. As another example, adjoining interlocking modular segments 18 may be coupled to each other using a rotatable attachment mechanism that allows the segments 18 to be rotated from the right angle configuration shown in FIG. 1 to the straight line configuration shown in FIG. 3. Such attachment mechanism may also include a locking mechanism that locks the joint between adjoining modular segments 18 into either configuration, as needed. As shown in FIG. 3, the strip 22 may be coupled to a perimeter (e.g., top) of the display screen 24 using suitable attachment legs 26. Other coupling mechanisms, such as, e.g., adhesive, hook and loop, etc., are also contemplated.

In others embodiments, the strip 22 is a standalone system, separate from the encasement 10. For example, the strip 22 may be specifically configured for use on large LCD screens or other display screens typically found in a home entertainment system. In such cases, the strip 22 may include enough power and sensory modules 12 to provide sensory stimulus across a room or other large distance, rather than to a user in close proximity to the display screen 24.

Figure 4:
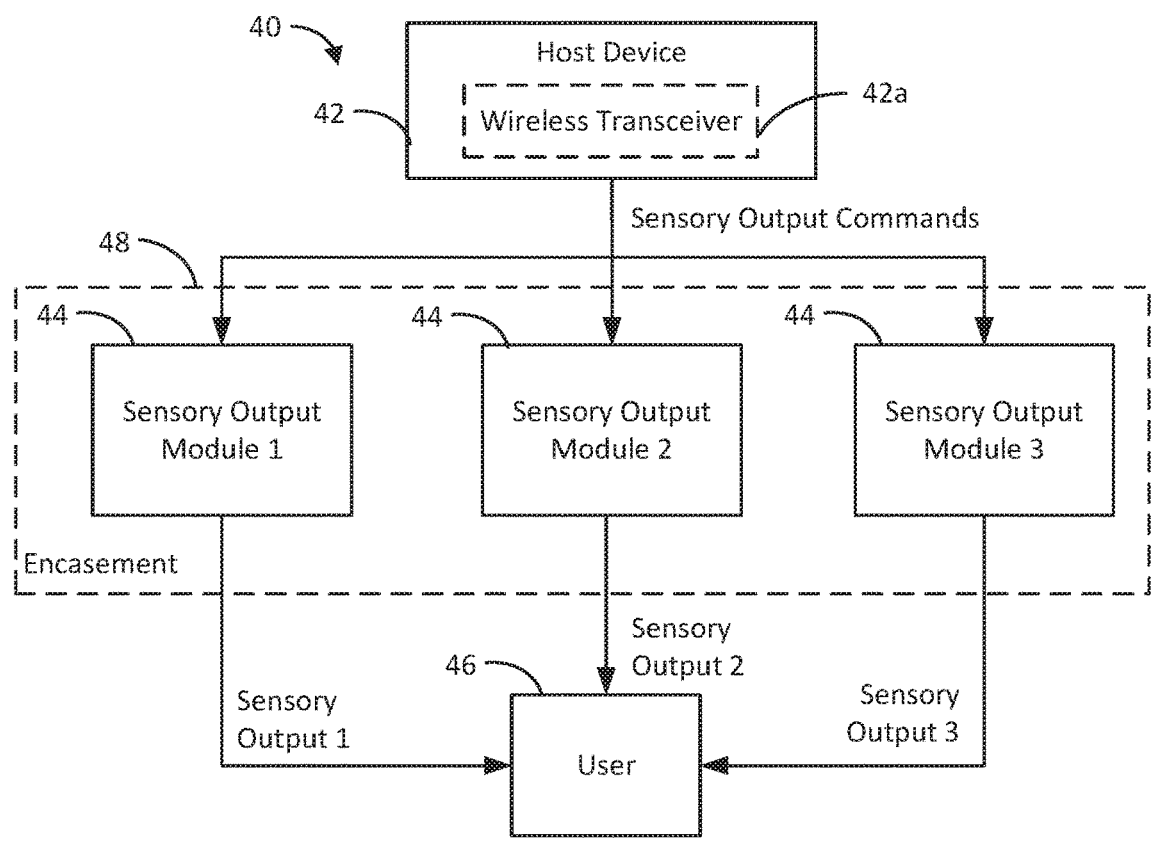
FIG. 4 is a block diagram illustrating an exemplary sensory immersive system, in accordance with certain embodiments.

FIG. 4 is a block diagram of an exemplary multi-sensory immersive system 40, in accordance with embodiments. The system 40 includes a host device 42 and a plurality of sensory output modules 44. The sensory output modules 44 may be included in an encasement 48 (such as, e.g., encasement 10 shown in FIG. 1) or other housing configured to receive the host device 42 therein. In some embodiments, the host device 42 may be a mobile device or portable electronic device, such as, e.g., a smartphone or tablet, for example, like the portable device 14 shown in FIG. 1. In other embodiments, the host device 42 may include other types of electronic devices, including, but not limited to, a personal computer, video game player, Virtual Reality headset, or a personal media player. The host device 42 can be in communication with the sensory output modules 44, using Bluetooth® or other wireless communication technology, to command each module 44 to output its specific sensory stimulus to the user 46 in a manner that is synchronized to specific audio-visual content being presented to the user 46 by the host device 42.

For purposes of illustration only, FIG. 4 shows three different sensory output modules 44 for delivering three different types of sensory outputs to the user 46 in synchrony with a corresponding portion of audio-visual content being presented to the user 46 by the host device 14. The sensory output modules 44 may include any appropriate type of stimulus delivery mechanism, including, but not limited to, haptic transducers, speakers, fan motors, heating and cooling elements, aroma discharge devices, water vapor discharge devices, or any other sensory immersion modality. As an example, sensory output module 1 may be a scent module comprising an aroma discharge device for delivering a scent-based output to the user 46, sensory output module 2 may be an air module comprising a fan for delivering an air-based output to the user 46, and sensory output module 3 may be a vibration module comprising a haptic transducer for delivering a haptic vibration output to the user 46. It should be appreciated that the system 40 could include more or fewer modules 44 and/or other types of sensory stimulus for each module 44, such as, for example, a moisture module comprising a liquid vaporizer for delivering a moisture-related output to the user 46, an audio module comprising an audio output device (e.g., speaker) for delivering an auditory output to the user 46, a light module comprising one or more lights for delivering a light-based output to the user 46, etc.

Figure 9:
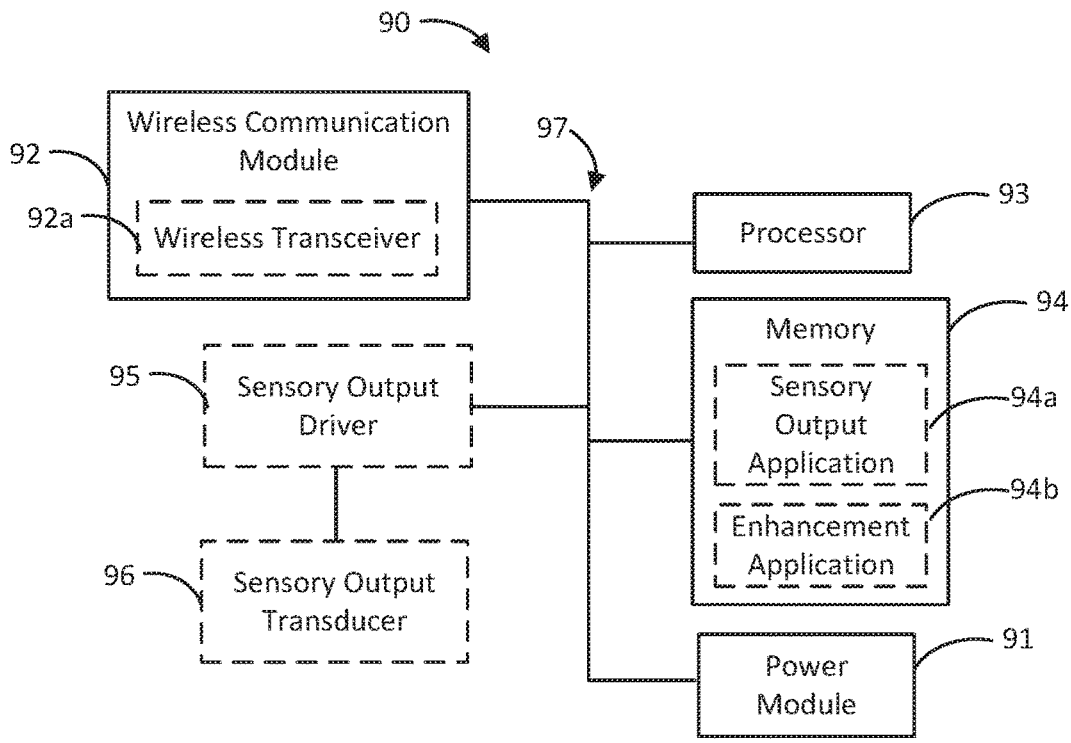
FIG. 9 is a block diagram illustrating an exemplary sensory output module, in accordance with embodiments.

Each of the various sensory output modules 44 will output their specific stimulus to the user 46 when triggered by specific components of an audio signal envelope being streamed from the host device 42 to the modules 44, or in response to commands embedded in a Bluetooth® or other wireless signal being transmitted by the host device 42 to the modules 44, or any combination thereof. In embodiments, each sensory output module 44 may include a wireless communication module and/or appropriate wireless transceiver, as in FIG. 5, to facilitate communication between the host device 42 and the modules 44. Likewise, the host device 42 may include an appropriate wireless transceiver 42a and/or other wireless communication circuitry to facilitate communication with the sensory output modules 44. Each of the host device 42 and the plurality of sensory output modules 44 may also include a processor configured, using software stored in a memory, to process incoming signals, prepare or generate outgoing signals, and/or initiate or cause appropriate actions in response to received signals (e.g., as shown in FIG. 9).

Figure 5:
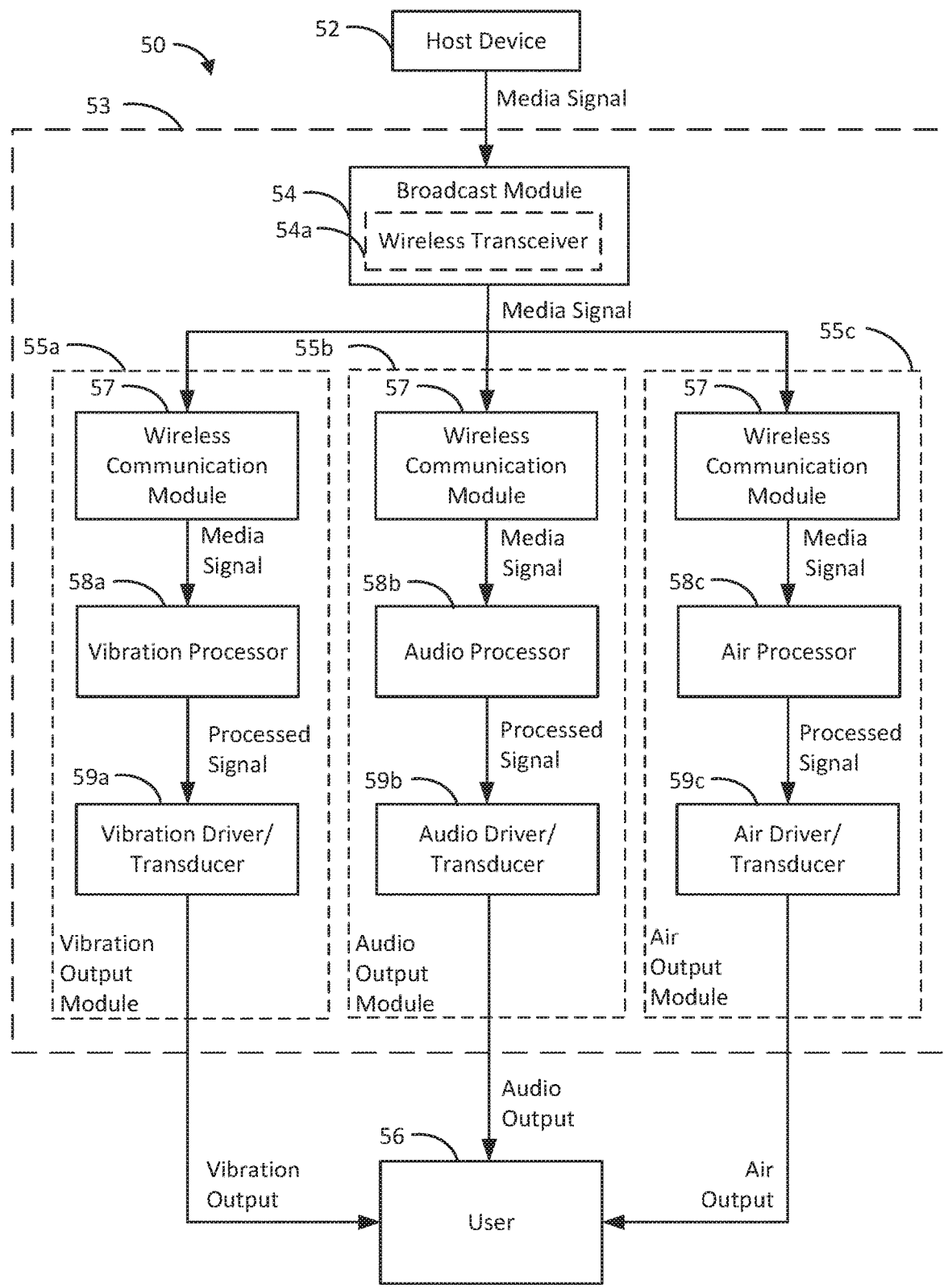
FIG. 5 is a block diagram illustrating another exemplary sensory immersive system, in accordance with certain embodiments.

In embodiments, when the encasement 48 is initially coupled to the host device 42, each of the sensory output modules 44 can inform the host device 42 of its presence by sending identifying information to the host device 42 using a Bluetooth® or other short-range wireless signal. The identifying information can be stored in a memory of each module 44 and can include a module number, which is unique for each module 44, and a module output type, which indicates the sensory stimulus output for that module 44, such as, e.g., air module, scent module, vibration module, etc. The host device 42 may send sensory output commands to the modules 44 that were initially registered in this manner using a Bluetooth® or other short range wireless connection. The wireless signals transmitted by the host device 42 may also include the module identifying information associated with the intended recipient, or receiving module 44. In such cases, each sensory output module 44 can include a sensory processor, as shown in FIG. 5, that is configured to check whether the commands coming in over Bluetooth® are meant for that module 44, for example, by looking at the module number and the output type information included in the incoming wireless signal. If the received identifying information matches the module's stored values, then the module 44 will execute the incoming command (see, e.g., process 80 or FIG. 8).

The sensory output commands can be delivered in synchrony with various aspects of the media content being viewed or listened to by the user 46 on the host device 42. Certain sensory output modules 44 may also be configured to recognize and output their function based on selected frequencies or amplitudes within the audio envelope of the audio signal being streamed from the host device 42 to the modules 44. In embodiments where one of the sensory output modules 44 is an audio speaker, the wireless transceiver of that module 44 may receive the full range wireless audio signal from the host device 42 and become the audio source for the electronic media being viewed or listened to by the user 46. In some embodiments, the modular segment containing the speaker, or anywhere else in the encasement 48, may include an audio port for connection to headphones or other personal audio listening device.

In one exemplary use case, the user 46 may be viewing a "point of view" type video of a downhill skier on the host device 42. As the skier picks up speed, a wireless command signal from the host device 42 may be provided to, and recognized by, the sensory output module 44 that has a built-in fan or rotor for outputting a burst of air to the user 46. The intensity and temperature of the burst of air may also be controlled by the wireless command signal, and the sensory output module 44 may further include mechanisms for outputting cold air (e.g., a cooling device) and increasing a force of the burst of air (e.g., adjustable fan speed). Using similar algorithms, any aspect of audio-visual content being viewed or listened to on the host device 42 can be paired with wirelessly transmitted command signals that activate the appropriate sensory stimulus module(s) 44, giving the user a deep multisensory immersion that is synchronized to the video or audio content.

FIG. 5 illustrates a block diagram of another exemplary sensory immersive system 50 for synchronizing sensory outputs to audio-visual or other media content, in accordance with embodiments. The sensory immersive system 50 includes a host device 52, similar to the portable device 14 of FIG. 1, communicatively coupled to a multi-sensory output device 53, similar to the encasement 10 of FIG. 1. As shown, the multi-sensory output device 53 includes a broadcast module 54 communicatively coupled to a plurality of sensory output modules 55, which are similar to the modules 12 shown in FIG. 1. The host device 52 may be configured to play, or otherwise present, audio, audio-visual, and/or other media content to a user 56 of the system 50. In the illustrated embodiment, the plurality of sensory output modules 55 includes a vibration output module 55a for providing haptic vibrations to the user 56 in synchrony with certain aspects of the media content, an audio output module 55b for auditory playback of an audio signal included in the media content, and an air output module 55c for providing an air-based stimulus (e.g., a burst or puff of hot or cold air, wind simulation, etc.) to the user 56 in synchrony with certain aspects of the media content.

In embodiments, a stream of media content (e.g., audio stream, video stream, etc.) can be transmitted from the host device 52 to the broadcast module 54 of the multi-sensory output device 53. The broadcast module 54 can be configured to stream the received media signal to each of the sensory output modules 55, as shown in FIG. 5. The broadcast module 54 may include a wireless transceiver 54a and other wireless communication circuitry to facilitate communication with the host device 52 and the modules 55. Similarly, each module 55 can include a wireless communication module 57 that includes, for example, a wireless transceiver, antenna, and/or other circuitry to facilitate wireless communication with the broadcast module 54 and/or the host device 52. As shown in FIG. 5, each module 55 also includes a processor 58, such as, for example, a Digital Signal Processor (DSP), that is configured (or programmed using software) to process the received media signals. Each module 55 also includes a driver/transducer component 59, which receives the processed signal from the processor 58 coupled thereto and based thereon, outputs its respective stimuli to the user 56.

The type of transducer included in each module 55 can depend on the type of stimulus being output by that module 55. For example, as shown in FIG. 5, the vibration output module 55a includes a haptic vibration transducer 59a (e.g., vibrator) for generating a haptic vibration output, the audio output module 55b includes an audio transducer 59b (e.g., speaker) for generating an audio output, and the air output module 55c includes an air transducer 59c (e.g., fan or rotor) for generating an air-based output. In some embodiments, the modules 55 may include additional circuitry or electronic components and/or more than one driver, transducer 59, or processor 58. For example, the air module 55c may also include heating and/or cooling element(s) that adjust a temperature of the air output generated by the air transducer 59c depending on the desired sensory output.

In embodiments, each of the processors 58 can include one or more filters specifically configured to filter selected aspects of the media signal, such as, for example, an audio envelope of audio content included in the media signal. The exact type of filter included in each module 55 may vary depending on the type of stimulus being output by the module 56 and/or the type of transducer 59 included in the module 55. The filters may be implemented using hardware and/or software, as will be appreciated.

For example, the vibration output module 55a may include a vibration DSP 58a with a vibration audio filter, such as, e.g., an average amplitude filter or the like, for providing a filtered audio signal that reflects the average amplitude of the audio envelope received at the vibration processor 58a. In such cases, the average amplitude filter may be programmed to recognize a specified average amplitude within the audio signal, and in response, the vibration processor 58a may be configured to engage the vibration driver/transducer 59a accordingly. The net result may be that the user feels a haptic stimulus in synchrony with the selected audio amplitudes. This module may also have its DSP 58a programmed to filter selected frequencies of the audio signal, such as low end vibrations, and have these same frequencies sent to the driver and transducer 59a, so the user may feel these low end frequencies synchronized to their occurrence in the audio stream.

As another example, the audio output module 55b may include an audio DSP 58b with equalizer (EQ), compressor, limiter, and/or filter functions or capabilities for processing an audio signal component of the media content. In such cases, the audio output module 55b receives the full audio signal from the broadcast module 54 in order to provide full range audio reproduction of the streamed audio to the user 56 using the audio driver/transducer 59b. It should be noted that sensory modules designed in this manner to function as a speaker can be included in any embodiment described herein, regardless of how other sensory output modules are commanded to output their stimuli.

As yet another example, the air output module 55c may include an air DSP 58c for both amplitude and frequency filtering. In this example, an air temperature output can be governed by a binary filter included in the air DSP 58c to recognize high and low frequencies as they occur in the audio stream. The air DSP 58c can also include an average amplitude filter or the other similar filter for generating an air intensity output that is proportional to selected average amplitudes in the audio stream. The net result is that the user will feel heated or cooled air at various intensities dependent upon selected characteristics of the audio envelope as they occur in the audio stream received from the host device 52.

Figure 6:
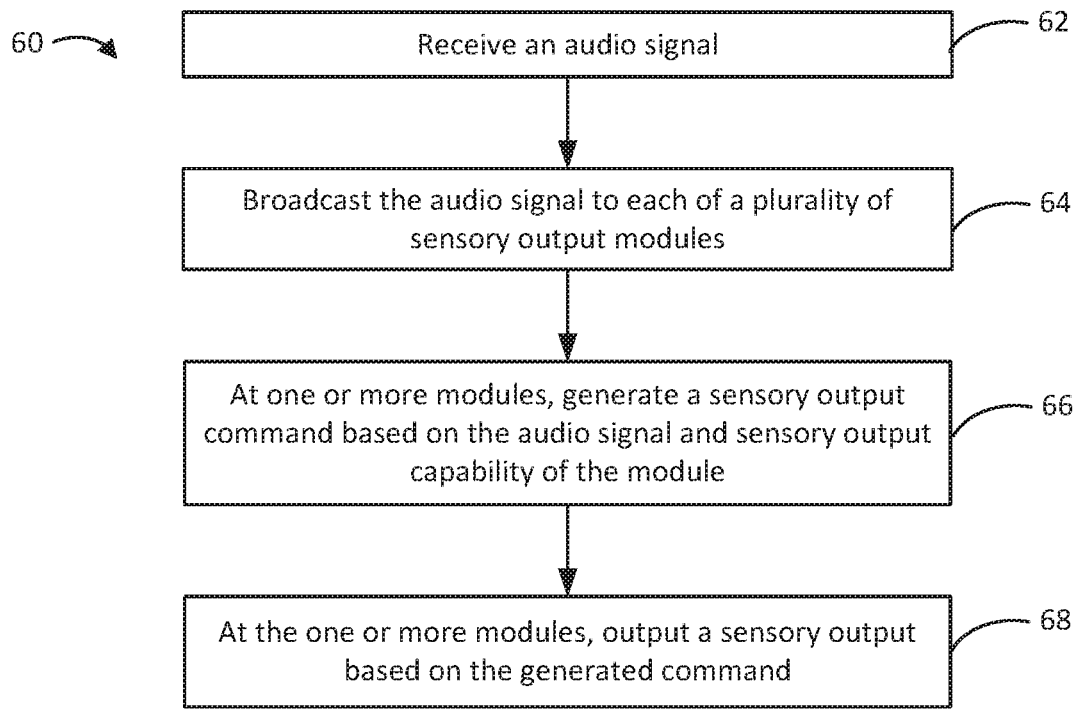
FIG. 6 is a flow chart illustrating an exemplary method of delivering multi-sensory stimulations to a user, in accordance with certain embodiments.

FIG. 6 is a flow chart illustrating an exemplary method 60 of delivering multi-sensory stimulations to a user in association with audio-visual content, or other media content, provided by an electronic device, in accordance with embodiments. All or portions of the method 60 may be performed by one or more processors and/or other processing devices. In addition, one or more other types of components (e.g., memory, input and/or output devices, transmitters, receivers, buffers, drivers, discrete components, logic circuits, etc.) may also be utilized in conjunction with the processors and/or other processing components to perform any, some, or all of the steps of the method 60. For example, program code stored in a memory may be executed by a processor coupled thereto in order to carry out one or more operations of the method 60. In certain embodiments, the method 60 may be implemented using, for example, a sensory immersive system, like the system 50 shown in FIG. 5, which includes a host device for providing media content to the user, a plurality of sensory output modules for providing appropriate sensory outputs to the user in synchrony with certain aspects of the media content, and a broadcast module for facilitating communication between the host device and the modules.

The method 60 may begin at step 62, where the broadcast module (such as, e.g., broadcast module 54 of FIG. 5) receives an audio signal associated with the media content, from a host device (such as, e.g., host device 52 of FIG. 5), via a wireless transceiver included in the broadcast module. At step 62, the received audio signal is broadcast to the plurality of sensory output modules (such as, e.g., the modules 56 shown in FIG. 5) by the broadcast module using the wireless transceiver included therein. At step 66, one or more of the sensory output modules generates, using its processor, a sensory output command based on the received audio signal and a sensory output capability of that module using a processor included in the module. For example, a vibration output module may generate a vibration command that is reflects an audio envelope of the audio signal. At step 68, each of the one or more sensory output modules outputs a sensory output based on the generated sensory output command. For example, the vibration output module may output a haptic vibration output using its vibration transducer based on the vibration command generated at step 66.

Figure 7:
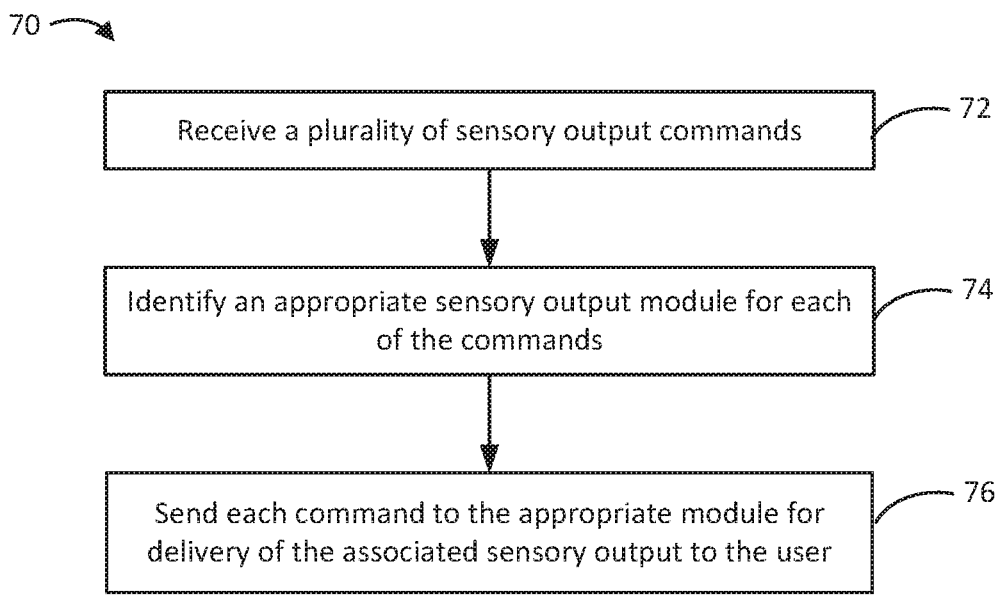
FIG. 7 is a flow chart illustrating another exemplary method of delivering multi-sensory stimulations to a user, in accordance with certain embodiments.

FIG. 7 is a flow chart illustrating another exemplary method 70 of delivering multi-sensory stimulations to a user in association with audio-visual content provided by an electronic device, in accordance with embodiments. All or portions of the method 70 may be performed by one or more processors and/or other processing devices. In addition, one or more other types of components (e.g., memory, input and/or output devices, transmitters, receivers, buffers, drivers, discrete components, logic circuits, etc.) may also be utilized in conjunction with the processors and/or other processing components to perform any, some, or all of the steps of the method 70. For example, program code stored in a memory may be executed by a processor coupled thereto in order to carry out one or more operations of the method 70. In certain embodiments, the method 70 may be implemented using, for example, a sensory immersive system like the system 40 shown in FIG. 4, which includes a host device for presenting the audio-visual or other media content to the user and a plurality of sensory output modules for providing appropriate sensory outputs to the user in synchrony with certain aspects of the media content.

The method 70 may begin at step 72, where a processor of the system 40 receives a plurality of sensory output commands via a wireless transceiver. The processor may be included in an encasement (such as, e.g., encasement 10 of FIG. 4) or other housing coupled to the host device (such as, e.g., host device 42 of FIG. 4) and comprising the sensory output modules. In such cases, the processor receives the commands from the host device via a wireless transceiver included in the encasement. Alternatively, the processor may be included in the host device itself and the commands may be received at the host device from an outside source (e.g., file sharing or social network described herein) via a network connection. At step 74, the processor identifies an appropriate sensory output module for each of the received commands, for example, based on identifying information included in the commands or received with the commands. The identifying information may include a unique module number for the intended recipient or module and an output type of that module. At step 76, the processor sends each command to the identified appropriate module, using the wireless transceiver. Each module then generates and delivers the associated sensory output to the user based on the received command.

Figure 8:
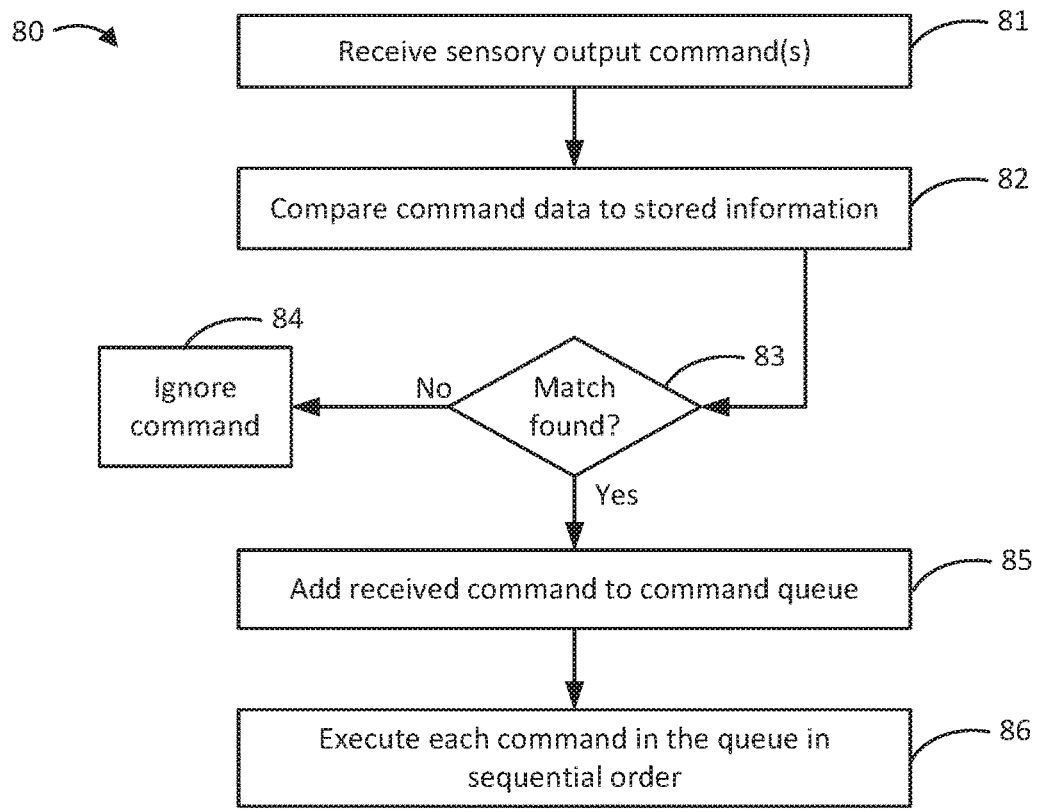
FIG. 8 is a flow chart illustrating an exemplary process for implementing sensory output command(s) using a sensory output module, in accordance with certain embodiments.

FIG. 8 is a flowchart illustrating an exemplary process 80 for implementing sensory output command(s) using a sensory output module, like one of the modules shown in FIG. 1, 3, 4, or 5, in accordance with embodiments. The process 80 may be implemented using a processor of the sensory output module executing software stored in a memory of the module (see, e.g., FIG. 9). The process 80 may be used to convert commands, wirelessly received from a host device (such as, e.g., host device 42 of FIG. 4) or a broadcast module (such, e.g., broadcast module 54 of FIG. 5), to sensory stimulus outputs for delivery to a user. For example, in the case of an air output module, such as, e.g., air output module 55c of FIG. 5, the sensory output command may direct the module to output heated or cooled air to the user in synchrony with selected portions of media content being presented by the host device.

Referring back to FIG. 8, the process 80 includes, at step 81, receiving sensory output commands from the host device. For example, the commands may be embedded in a Bluetooth® or other wireless signal that is communicated to the module by the host device. The commands may include various forms of identifying information and other data, including, for example, a sensory output module identifier (ID), which may be, e.g., a numeric or alpha-numerical identifier, a command type (e.g., AIR, VAPOR, HAPTIC, AUDIO, etc.), and command parameters that are specific to the output type, such as, for example, a temperature parameter (e.g., number of degrees Celsius/Fahrenheit), an intensity parameter (e.g., percentage value, decibels, or other appropriate value), and/or a duration parameter (e.g., number of milliseconds). In embodiment, the intensity parameter may be a sound intensity or other appropriate signal intensity depending on the type of sensory output.

At step 82, the commands may be provided to a sensory output module command filter that compares certain command data (e.g., module ID and command type) to information stored in a memory of the module. At step 83, a determination is made as to whether the incoming command data matches the stored information. If a match is not found, the process 80 continues to step 84, where the processor ignores the command. If a match is found at step 83, then the process 80 continues to step 85, where the received command is processed and sent to a command queue for the module that operates on a first-in, first-out basis. At step 86, the processor executes each command in the queue in a sequential order until the command queue is cleared.

In embodiments, a command received, at step 81, by a processor of the sensory output module, can include data for the control of intensity (e.g., as a percentage, in decibels, or other appropriate value), duration (e.g., in milliseconds), and temperature (e.g., in degrees Celsius) parameters associated with a particular sensory output. In one example use case, the command includes an air output command intended for an air output module, like the module 55c shown in FIG. 5. At steps 82 and 83, the command is verified, by the processor (e.g., air processor 58c shown in FIG. 5), as being the right type of command for the receiving sensory output module (e.g., an AIR command for an air output module).

When it is time to execute the command at step 86, the received command can be sent from the processor to a sensory output driver (e.g., air driver) of the sensory output module, which sends an appropriate signal to a sensory output transducer unit (e.g., air transducer) also included in the sensory output module (e.g., driver/transducer 59c shown in FIG. 5). In the case of an air output module, in response to the received command signal, the air transducer sends control signals for activating a rotor or fan (e.g., a PWM fan control signal) to modulate air for the transducer output and control signals for activating a heating or cooling element (e.g., an analog voltage temperature control signal) to modulate temperature for the transducer output, in proportion to the specified effect included in the command signal. For example, once activated or triggered by a command from the transducer unit, the rotor can push air through the heating or cooling element, which has been configured based on temperature information included in the command, at the intensity and duration specified by the commands, to then be felt by the user. This type of algorithm could be used, for example, while the user watches a video in which an explosion takes place. At the time of the explosion, a burst of heated air can be directed at the user via synchronized wireless command signals that activate a wind and temperature sensory output module housed within the sensory immersive encasement.

FIG. 9 is a simplified block diagram of an exemplary computing device 90 that may be representative of the computing device included any of the various host devices and output modules described herein, including, for example, the host device 14 shown in FIG. 1, the computing device coupled to the display screen 24 shown in FIG. 3, the host device 42 shown in FIG. 4, the host device 52 shown in FIG. 5, any of the sensory output modules 12 shown in FIGS. 1 and 3, any of the sensory output modules 44 shown in FIG. 4, and any of the sensory output modules 55 shown in FIG. 5. The computing device 90 may be configured for performing a variety of functions or acts, such as those described in this disclosure (and accompanying drawings).

In the case of sensory output modules, each computing device/sensory output module 90 can be a standalone electronics unit that can operate without the presence of other modules. For example, in the illustrated embodiment, the computing device/module 90 has its own battery and power management module 91. In other embodiments, the encasement in which the computing device/module 90 is housed may have a battery module that supplies power to all of modules connected to it (not shown). As shown, the computing device 90 also includes a wireless communication module 92, a processor 93, and a memory 94. The electronics making up these components of the computing device/module 90 may be the same for all of the modules within an encasement. Also in the case of sensory output modules, each computing device/module 90 may include specific sensory output driver 95 and transducer 96 that are unique to the computing device/module 90 depending on the output type of the module. For example, an air output module may include a rotor and a heater/cooler transducer, as well as an appropriate driver (e.g., a PWM and Peltier driver).

As shown, the computing device 90 also includes a communication bus 97 (e.g., I2C or SPI or UART) that is configured to interface with the processor 93, the memory 94, the power module 91, the wireless communication module 92, and the sensory output driver 95 (if included). For example, the communication bus 97 may include one or more wires, traces, or other mechanisms for communicatively coupling these devices. Commands or other information received at the wireless communication module 92 may be provided to the communication bus 97 for transport to the processor 93 for processing. In the case of sensory output modules, the sensory output driver 95 receives commands or other signals from the processor 93 via the communication bus 97, and then drives or causes the sensory output transducer 96, via analog voltage or digital control interfaces, to deliver the related stimulus to the user.

The wireless communication module 92 may include one or more wireless transceivers 92a, such as, e.g., a Bluetooth® transceiver or other short range transceiver (e.g., RFID, Near-Field Communication (NFC), etc.), and other wireless communication circuitry for supporting these and/or other network connections (e.g., WiFi, WLAN, cellular, GPS, etc.). In the case of sensory output modules, sensory output commands may be received at the wireless communication module 92 via standard or low energy Bluetooth® communication.

The processor 93 may include a general purpose processor (e.g., a microprocessor) and/or a special purpose processor (e.g., a digital signal processor (DSP)), depending on the functionalities to be performed by the particular computing device 90. Processor 93 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The memory 94 may be volatile memory (e.g., RAM including non-volatile RAM, magnetic RAM, ferroelectric RAM, etc.), non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 94 includes multiple kinds of memory, particularly volatile memory and non-volatile memory.

The memory 94 may be computer readable media on which one or more sets of instructions, such as the software for operating the methods of the present disclosure, can be embedded. For example, the instructions may embody one or more of the methods or logic described herein, such as, e.g., a sensory output application 94a for implementing method 60 of FIG. 6, method 70 of FIG. 7, or method 80 of FIG. 8, and/or an enhancement application 94b for adding a layer of haptic and other sensory stimulus to audio-video recordings or otherwise implementing the enhancement tool described herein. The instructions may reside completely, or at least partially, within any one or more of the memory 94, the computer readable medium, and/or within the processor 93 during execution of the instructions.

As an example, the enhancement application 94b may include instructions for implementing a method of enhancing media content provided to a user using an electronic device (e.g., host device 14 shown in FIG. 1) connected to at least one sensory output device (e.g., encasement 10 or at least one of the modules 12 shown in FIG. 1). When executed by the processor 93, the enhancement application 94b may cause the processor 93 to receive indication of a selected portion of the media content and a desired sensory output for the selected portion; generate at least one sensory output command based on at least one characteristic of the selected portion and the desired sensory output; and synchronize output of the at least one sensory output command via the multi-sensory output device with playback of the selected portion on the electronic device. In such cases, the at least one characteristic may be a selected characteristic of an audio signal envelope associated with the selected portion of the media content or a sound intensity value associated with the selected portion. Further, the desired sensory output may cause the at least one sensory output device to produce at least one of a haptic vibration output, an air-based output, a water-vapor-based output, a scent-based output, a moisture-based output, a temperature-based output, a haptic immersion output, a light-based output, etc. The selected portion of media content and/or the desired sensory output may be user-defined (e.g., if developed by the consumer or end user) or predetermined (e.g., if developed by the content creator). The generated sensory output command(s) may include, for example, an intensity value (e.g., a modified sound intensity value different from the original sound intensity characteristic, a signal intensity value related to the type of sensory output, etc.), a time duration value (e.g., a length of time the output will last), and/or other value(s) specific to the sensory output type (e.g., a temperature value for a temperature-based output, a light color value for a light-based output, etc.).

The terms "non-transitory computer-readable medium" and "computer-readable medium" include a single medium or multiple media, such as a centralized or distributed database, and/or associated caches and servers that store one or more sets of instructions. Further, the terms "non-transitory computer-readable medium" and "computer-readable medium" include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

In one or more of the embodiments described above, a user may experience, via the host device, any combination of audio and video content synchronized sensory stimuli that are deployed from sensory output modules activated by any combination of the streaming commands disclosed herein and shown in FIGS. 4-8. The modular segments that house the sensory output modules may form an encasement for use with smartphones, tablets, and the like. The modular segments may be configured to attach to a virtual reality headset when the host device is a VR game. The modular segments may be reconfigured into one or more strip forms for attachment to a monitor when the host device is a PC or laptop, or video game to be viewed on a monitor. In some embodiments, the immersive system may be scaled-up to produce larger modules with higher outputs for use with big screen televisions and other large video monitors.

In other embodiments, the encasement or strip version of the device may be of a fixed dimension of singular construction without modular segments.

In another embodiment, the communication between the host device and the encasement or strip may be a hardwired input to the host device's USB port, docking port, HDMI port, or other suitable input or output.

With regard to the audio and video editing aspect of the present disclosure, in some cases, the user can import an audio or video recording (or file) from a handheld or other computing device (e.g., smartphone, tablet, etc.) to an enhancement tool or software program. In other cases, the enhancement tool may be a plug-in, filter, or other piece of software that works in conjunction with another, larger software application or platform with audio-video enhancement or editing capabilities, such as, e.g., an existing file sharing, media sharing, or social network, or other existing software program.

In one embodiment, when the audio or video is played back, the enhancement tool scans the audio profile for selected characteristics of the audio envelope, such as, e.g., selected frequencies or amplitudes, or determines other characteristics of the audio/video content, such as, e.g., a sound intensity value, and generates synchronized haptic command signals that are compatible with the haptic motor of the handheld device. In this manner, the user can create an audio-synchronized haptic vibration experience from the handheld device. In another embodiment, when the audio or video is played back by the enhancement tool, it streams the audio signal to an audio broadcast module (see FIG. 5), which then activates various sensory output modules, as disclosed with reference to FIG. 5 and FIG. 6. In this manner, selected components of the streamed audio signal produce content-synchronized stimulations to the user.

In yet another embodiment, after importing a video file to the enhancement tool, the user can direct the tool to overlay an audio file (such as a sound effect), a theme-based image file, or a haptic command signal to a selected segment of the video file. The enhancement tool may also allow the user to add all three, or any other combination thereof, as a prelayered effect (for example, a theme-based combination of image file, sound effect, and haptic command all in one editing function). After this added data is rendered by the enhancement tool, when played back, the user will hear a overlaid sound effect, see an image file, and feel a haptic (from the haptic motor contained in the host device, such as a smart phone or tablet) at that segment of the video. This embodiment would require no added or external sensory output module devices, and would function with standard haptic motor contained in the handheld device.

In still another embodiment, after the user imports a video to the enhancement tool, the user can direct the tool to embed, into a selected video segment, an audio file (such as a sound effect), a theme-based image file, a haptic command, and/or any other command signal that can be recognized by an external sensory output module for the delivery of such stimuli, for example, as wind, temperature, aroma, or water vapor (see, e.g. FIG. 6). The enhancement tool may also allow the user to add any combination of these as prelayered effects (for example, a theme-based combination of image file, sound effect, haptic command, wind command, and aroma command all in one editing function). After this added data is rendered by the enhancement tool, when played back, the user will hear a sound effect, see an image file on the video screen, and feel a variety of content synchronized stimuli from the sensory output module devices that may receive commands via streaming data from the enhancement tool.

In another embodiment, a high frequency/ultrasonic carrier wave can be used to activate the sensory output modules.

In another embodiment, command signals can be edited or added into a video recording, in real, or near real, time, using sensors that read the real-time ambient conditions while the video is being recorded. For example, sensors that measure wind velocity, temperature, humidity, and ambient low frequency vibrations can report sensor data to a processor, and in response, the processor can generate appropriate command signals based on the received measurements or data and embed the generated commands into the video data as the video is being recorded. These command signals may be recognized by appropriate sensory output modules during playback of the video by a host device coupled to the sensory output modules. In this manner, while the host device plays the video, the sensory output modules can be used to reproduce or mimic the ambient conditions that were present during the actual video recording. The ambient condition sensors can be an external array of devices electronically interfaced with the video recording device, or may be standard or existing features of the handheld device (e.g., smartphone or other portable video recorder).

In another embodiment, ambient outdoor conditions can be uploaded from existing web-based GPS weather monitoring systems and used to initiate the embedding of command signals into real-time video recordings. The command signals would then trigger the reproduction of ambient conditions via sensory output modules during playback of the video.

In another embodiment, the enhancement tool can be utilized during a video conferencing session between users. During such sessions, users who are logged-on to the enhancement tool may issue real-time command signals to their conference partner's smart device and/or multisensory output device (e.g., encasement) comprising sensory output modules. In this way, one user may cause the other, in real time, to experience any combination of singular or prelayered added audio file, image file, and multisensory immersions, as desired.

In another embodiment, because the modular segments that contain one or more sensory output modules are detachable (as described herein with respect to FIG. 1), and because each sensory output module can function independently (as described herein with respect to FIG. 9), the modules may be attached to the body, or placed on or within any other object desired by the user. In such cases, the sensory outputs of the various modules can be initiated in synchrony with select audio or video recording content, in accordance with any of the various embodiments described herein, for example, with respect to FIGS. 4-8, and/or can be triggered to output in real-time at a user's discretion using the methods discussed in relation to video conferencing.

Thus, the present disclosure provides a system whereby a user may produce, store, experience, and share audio and video recordings that have been uniquely edited to initiate audio-visually synchronized multisensory stimulations.

These enhancements can involve overlaying added audio and visual data, as well as embedding command signals that cause a plurality of sensory output modules to deliver stimuli to the user, such as, e.g., haptic vibration, wind, water vapor, aroma, temperature, or any other sensation that can be synchronized with audio-visual content. The present disclosure also provides attachable, portable, sensory output modules that can be used in conjunction with a variety of portable electronic devices, such as, e.g., smart phones, tablets, and laptops, as well as with Virtual Reality headsets, and other home entrainment systems. The sensory output modules are programmed to receive audio-visually synchronized commands embedded by the user, or other content provider, into selected segments of the audio or video recording, and then deliver these multi-sensory stimulations to the user. The sensory output modules may also be activated by selected characteristics within the envelope of an audio signal. In some cases, the enhancement tool can be accessed via a web-based file sharing or social network where users may uniquely edit, store, and share their multisensory enhanced audio and video recordings.

This disclosure is intended to explain how to fashion and use various embodiments in accordance with the technology rather than to limit the true, intended, and fair scope and spirit thereof. The foregoing description is not intended to be exhaustive or to be limited to the precise forms disclosed. Modifications or variations are possible in light of the above teachings. The embodiment(s) were chosen and described to provide the best illustration of the principle of the described technology and its practical application, and to enable one of ordinary skill in the art to utilize the technology in various embodiments and with various modifications as are suited to the particular use contemplated. All such modifications and variations are within the scope of the embodiments as determined by the appended claims, as may be amended during the pendency of this application for patent, and all equivalents thereof, when interpreted in accordance with the breadth to which they are fairly, legally and equitably entitled.

The invention claimed is:

1. A portable system for delivering multi-sensory stimulation to a user in association with audio-visual content, the system comprising:
    a plurality of sensory output modules, each module configured to deliver a different sensory output to the user in synchrony with a corresponding portion of the audio-visual content and responsive to a corresponding sensory output command,
    wherein for each sensory output module, the corresponding sensory output command is generated based on a sound intensity value of an audio signal included in the audio-visual content and a sensory output capability of the module, each command comprising a time duration value and an intensity value selected based on the sound intensity value of the audio signal; and
    a housing comprising the plurality of sensory output modules, the housing configured for attachment to an electronic device capable of presenting the audio-visual content to the user,
    wherein the housing is comprised of a plurality of modular segments, each segment detachably coupled to at least one other modular segment and configured to receive a portion of the electronic device, and
    wherein each sensory output module is housed within a select one of the modular segments, the plurality of sensory output modules comprising at least one air module comprising a fan and a heating and/or cooling element for delivering a temperature-controlled, air-based output to the user responsive to a first sensory output command including an air intensity value selected based on the sound intensity value of the audio signal.

2. The portable system of claim 1, wherein the housing is configured to encase at least one side of the electronic device.

3. The portable system of claim 1, wherein the housing is configured for attachment adjacent to a perimeter of the electronic device.

4. The portable system of claim 1, wherein the plurality of sensory output modules further includes a moisture module comprising a liquid vaporizer for delivering a moisture-related output to the user.

5. The portable system of claim 1, wherein the plurality of sensory output modules further includes at least one scent module comprising an aroma discharge device for delivering a scent-based output to the user.

6. The portable system of claim 1, wherein the plurality of sensory output modules further includes at least one audio module comprising an audio speaker for delivering the audio signal as an auditory output to the user.

7. The portable system of claim 1, further comprising a primary wireless transceiver disposed in the housing and configured to communicate with the electronic device.

8. The portable system of claim 7, wherein each of the plurality of sensory output modules further includes a module wireless transceiver for communicating with the primary wireless transceiver.

9. The portable system of claim 8, wherein the primary wireless transceiver is configured to send the corresponding sensory output command to each module wireless transceiver.

10. The portable system of claim 8, wherein the primary wireless transceiver receives the audio signal included in the audio-visual content from the electronic device and broadcasts the received audio signal to the module wireless transceivers.

11. The portable system of claim 10, wherein each sensory output module comprises a processor configured to generate the corresponding sensory output command.

12. The portable system of claim 8, wherein the primary wireless transceiver and each of the module wireless transceivers are configured to use BLUETOOTH technology to communicate with each other and/or the electronic device.

13. The portable system of claim 1, wherein the plurality of sensory output modules further comprises at least one vibration module comprising a haptic transducer for delivering a haptic vibration output to the user.

14. A method of delivering multi-sensory stimulations to a user in association with audio-visual content provided by an electronic device, the method comprising:
    receiving an audio signal included in the audio-visual content via a wireless transceiver;
    broadcasting the audio signal to each of a plurality of sensory output modules via the wireless transceiver, the plurality of sensory output modules being disposed in a housing and comprising at least one air module for delivering a temperature-controlled, air-based output to the user;
    at one or more of the plurality of sensory output modules, generating, using a processor included in said module, a sensory output command based on: (i) a sound intensity value of the audio signal and (ii) a sensory output capability of the module, the sensory output command comprising a time duration value and an intensity value selected based on the sound intensity value of the audio signal; and outputting a sensory output from each of the one or more sensory output modules based on the sensory output command generated by the processor of the corresponding module and in synchrony with a corresponding portion of the audio-visual content, wherein the sensory output command generated by the at least one air module comprises an air intensity value selected based on the sound intensity value of the audio signal, and wherein the housing is comprised of a plurality of modular segments, each segment detachably coupled to at least one other modular segment and configured to receive a portion of the electronic device, and each sensory output module is housed within a select one of the modular segments.

15. The method of claim 14, wherein the plurality of sensory output modules further comprises at least one of a vibration module comprising a haptic transducer for delivering a haptic vibration output to the user, a moisture module comprising a liquid vaporizer for delivering a moisture-related output to the user, and a scent module comprising an aroma discharge device for delivering a scent-based output to the user.

16. A method of enhancing media content provided to a user using an electronic device connected to a plurality of sensory output devices, the method comprising:

receiving indication of a selected portion of the media content and one or more desired sensory outputs for the selected portion, wherein the one or more desired sensory outputs includes an air-based output;

for each of the one or more desired sensory outputs, generating a corresponding sensory output command based on a type of the desired sensory output and a sound intensity value of an audio signal included in the selected portion of the media content;

providing each sensory output command to a corresponding sensory output device based on a sensory output capability of each device; and synchronizing delivery of the one or more desired sensory outputs to the user, via the corresponding sensory output device, with playback of the selected portion of the media content on the electronic device, wherein each sensory output command comprises a time duration value and an intensity value selected based on the sound intensity value of the audio signal, the sensory output command for delivering the air-based output comprising an air intensity value selected based on the sound intensity value of the audio signal, and wherein the plurality of sensory output devices are disposed in a housing comprised of a plurality of modular segments, each segment being detachably coupled to at least one other modular segment and configured to receive a portion of the electronic device, and each sensory output module being housed within a select one of the modular segments.

17. The method of claim 16, wherein the one or more desired sensory outputs further comprises at least one of a haptic vibration output, a scent-based output, a moisture-based output, a light-based output, and a temperature-based output.

18. The method of claim 16, wherein at least one of the selected portion and the one or more desired sensory outputs is a user-defined value.

19. The method of claim 16, wherein at least one of the selected portion and the one or more desired sensory outputs is a predetermined value.

* * * * *